United States Patent [19]

Goulette

[11] Patent Number: 4,897,931

[45] Date of Patent: Feb. 6, 1990

[54] ANGLE INDICATING CALIPER

[75] Inventor: Stephen D. Goulette, Rives Junction, Mich.

[73] Assignee: Aeroquip Corporation, Jackson, Mich.

[21] Appl. No.: 248,141

[22] Filed: Sep. 23, 1988

[51] Int. Cl.⁴ .............................................. G01B 5/14
[52] U.S. Cl. .................................... 33/810; 33/532; 33/534; 33/541
[58] Field of Search ................ 33/783, 806, 810, 811, 33/812, 517, 531, 532, 534, 541

[56] References Cited

U.S. PATENT DOCUMENTS

| | | | |
|---|---|---|---|
| 1,002,149 | 8/1911 | Hauser | 33/810 |
| 1,672,695 | 6/1928 | Simpson | 33/201 X |
| 2,694,262 | 11/1954 | Daniel | 33/810 X |
| 2,801,472 | 8/1957 | Davidiak et al. | |
| 3,113,384 | 12/1963 | Keszler | |
| 4,677,751 | 7/1987 | Masseth | |
| 4,730,399 | 3/1988 | Campbell | |

FOREIGN PATENT DOCUMENTS 51958   9/1919   Sweden ................................ 33/175

*Primary Examiner*—Harry N. Haroian
*Attorney, Agent, or Firm*—Beaman & Beaman

[57] ABSTRACT

This invention pertains to slide calipers for use with hose fittings wherein the improved construction includes caliper fingers having angles corresponding to standard hose fitting adapter sealing surface angles thus allowing the user to identify the type of adapter angle being measured. At the same time the caliper fingers act as reference points for measuring the size of a hose or fitting.

3 Claims, 1 Drawing Sheet

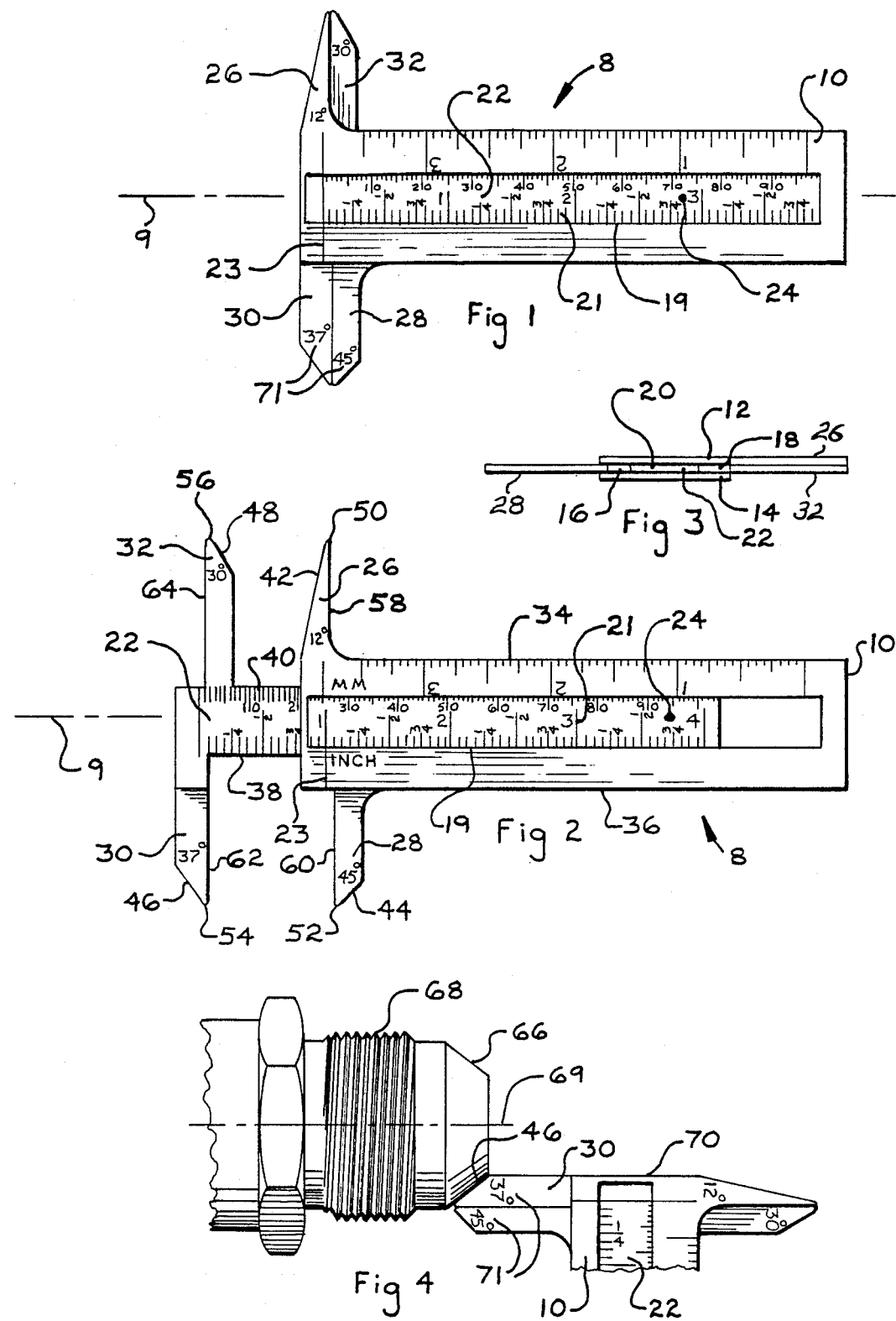

4,897,931

ANGLE INDICATING CALIPER

BACKGROUND OF THE INVENTION

For transmission of fluids, many types of hoses and fitting adapters are needed. As a result, industry has developed a large variety of fittings and adapters with various sizes and sealing surface angles. The user is then put in a situation where identification of the angles and dimensions of these parts are necessary to match interconnected fittings.

Until now, the devices available to make these measurements have been inconvenient to use and expensive. Typical devices of the slide caliper type are shown in Pat No. 2,801,472, Pat No. 3,113,384 and Pat No. 4,667,751, and while 4,667,751 is intended for use with hose fittings and will measure the angles of an adapter, a plurality of separate feeler gauges are used which makes the caliper expensive and difficult to use.

In the measuring tool of the invention the caliper fingers include reference angle surfaces corresponding to standard adapter sealing surface angles so that the user can determined standard types of adapter sealing surfaces.

The improved caliper consists of a bar and slide adapted to interact with the bar. Both the bar and slide have extensions mounted in a transverse direction to the longitudinal body axis. These extensions or fingers define the angled surfaces for identifying standard fitting angles. Also, the fingers function as reference points for measuring the size of a hose or fitting.

The caliper fingers are used in the normal manner to measure inside and outside dimensions, and when it is desired to determine the angle of an adapter sealing surface a finger angle surface is placed against the fitting sealing surface. If the proper angle surface engages the sealing surface the axis of the caliper slide will be perpendicular to the adapter axis as readily discernable by the user. Indicia defined on each finger identifies the associated angle surface.

BRIEF DESCRIPTION OF THE DRAWINGS

The aforementioned objects and advantages of the invention will be appreciated from the following description and accompanying drawings wherein:

FIG. 1 is an elevational view of a slide caliper in accord with the invention,

FIG. 2 is an elevational view of the slide caliper in a position for measuring an inside or outside dimension, FIG. 3 is an end view of the slide caliper as taken from the right of FIG. 1 showing the opening for the slide, and FIG. 4 illustrates the use of a caliper for measuring an adapter sealing surface.

DESCRIPTION OF THE PREFERRED EMBODIMENT

The slide caliper of the invention consists of an assembly 8 having a longitudinal axis 9 as shown in FIGS. 1 and 2. One part of the assembly comprises a bar 10 formed of two flat sheets 12 and 14 which are separated in spaced relationship by thin parallel strips 16 and 18. The purpose of the strips is to create a guide opening 20 between the sheets. The strips 16 and 18 are spot welded to the sheets 12 and 14. An elongated slide 22, comprises the other part of the assembly 8 which is slightly thinner than the strips 16 and 18 and is adapted to be slidable between the sheets 12 and 14 in the guide opening 20.

The sheet 12 is provided with a rectangular opening 19 through which the indicia 21 defined on the slide 22 may be viewed and a comparison of the relative position of the slide indicia 21 and indicia 23 defined on the sheet 12 will permit the extent of movement of the slide 22 to the body 10 to be measured. Protrusion 24 defined on the slide 22 extending into opening 19 limits extension of the slide relative to body 10.

The caliper includes extensions or fingers 26 and 28 extending from the strips 18 and 16 on edges 34 and 36, respectively. Likewise, the slide 22 has finger extensions 30 and 32 mounted on the edges 38 and 40, respectively. For determining the diametrical size of a hose or fitting, the fingers 26 and 32 include reference surfaces 58 and 64, respectively for measuring inside dimensions and surfaces 60 and 62 on fingers 28 and 30, respectively, will measure outside dimensions, in the known manner.

The extensions 26, 28, 30, and 32 also each have a angled surface corresponding to the conical ends of standard hose fittings. Extension 28 has an angled surface 44 that starts at apex 52 and is related to 45° to the edge 60. Extension 30 has an angled surface 46 that starts at apex 54 and is related at 37° to the edge 62. Extension 32 has an angled surface 48 that starts at apex 56 and is related at 30° to the edge 64. Extension 26 has an angled surface 42 that starts at apex 50 and is related at 12° to the edge 58.

An example showing the use of the caliper for identifying the sealing surface of standard type hose fittings is illustrated in FIG. 4. By trial and error the surfaces 42, 44, 46 and 48 are matched against the conical end 66 of the adapter fitting 68. When one of the angle surfaces is fitted firmly against the conical end 66 and the edge 70 of slide 22 is parallel to the longitudinal axis 69 of the fitting 68 and the axis 9 is perpendicular to axis 69 the sealing surface 66 of fitting 68 can be identified by the indicia 71 adjacent the angle surface. In the case shown in FIG. 4 the angled surface 46 of the extension 30 indicates that the end 66 is on a 37° angle.

As will be appreciated from the above description the caliper of the invention may be used for quick diametrical measurements and identification of conical adapter sealing surfaces with ease and accuracy. It is appreciated that various modifications to the inventive concepts may be apparent to those skilled in the art without departing from the spirit and scope of the invention.

I claim:

1. A slide caliper for measuring the characteristics of a hose fitting wherein the hose fitting includes a conical sealing surface having an angle of convergence and the caliper includes a body having a longitudinal axis, a slide mounted on the body for movement relative to the body in the direction of the axis, first and second measurement extensions mounted on the body and slide, respectively, extending in a transverse direction to the body axis for engaging the fitting to be measured and indicia defined on the body and slide to indicate the relative movement therebetween, each extension including a first edge perpendicular to the body axis and a second edge, the improvement comprising an angular surface defined on the second edge of each of the extensions having a predetermined angular orientation to the body axis, the angular orientation of said angular surfaces being different and of an angle corresponding to a standard sealing surface angle whereby placing an angular surface against a fitting sealing surface permits the angle of the fitting surface to be determined.

2. In a slide caliper for measuring those fittings as in claim 1, each of the extensions having a dimension measuring surface and a non-dimension measuring surface, an angular surface being defined upon said non-dimension measuring surface of each of the extensions.

3. In a slide caliper for measuring hose fittings as in claim 1, two pairs of measurement extensions defined on the body and slide, each of the extensions including a first edge and a second edge, an angular surface defined on the second edge of each extension of each pair, and the angular orientation of each angular surface being different from the angular orientation of any other extension second edge.

* * * * *